United States Patent [19]
Huck et al.

[11] Patent Number: 5,749,084
[45] Date of Patent: *May 5, 1998

[54] ADDRESS GENERATION UNIT WITH SEGMENTED ADDRESSES IN A MICROPROCESSOR

[75] Inventors: Kamla P. Huck, Portland; Scott D. Rodgers; Andrew F. Glew, both of Hillsboro, all of Oreg.

[73] Assignee: Intel Corporation, Santa Clara, Calif.

[*] Notice: The term of this patent shall not extend beyond the expiration date of Pat. No. 5,590,297.

[21] Appl. No.: 634,092

[22] Filed: Apr. 17, 1996

Related U.S. Application Data

[63] Continuation of Ser. No. 176,066, Jan. 4, 1994, Pat. No. 5,590,297.

[51] Int. Cl.⁶ .............. G06F 12/02; G06F 12/06; G06F 12/10
[52] U.S. Cl. .................. 711/1; 711/100; 711/3; 711/206; 711/200
[58] Field of Search ................. 395/401, 420, 395/415, 417, 418, 419, 421.07, 421.1, 653, 490, 570, 800; 365/49

[56] References Cited

U.S. PATENT DOCUMENTS

| | | | |
|---|---|---|---|
| 4,597,044 | 6/1986 | Circello | 395/653 |
| 4,779,187 | 10/1988 | Letwin | 395/570 |
| 5,144,551 | 9/1992 | Cepulis | 395/490 |
| 5,173,872 | 12/1992 | Crawford et al. | 365/49 |
| 5,255,379 | 10/1993 | Melo | 395/412 |
| 5,274,834 | 12/1993 | Kardach et al. | 395/800 |
| 5,303,378 | 4/1994 | Cohen | 395/737 |
| 5,590,297 | 12/1996 | Huck et al. | 395/401 |

*Primary Examiner*—David K. Moore
*Assistant Examiner*—Than V. Nguyen
*Attorney, Agent, or Firm*—Blakely, Sokoloff, Taylor & Zafman

[57] ABSTRACT

A processor having an address generation unit (AGU) for generating an address corresponding to an entry that is to be fetched. The AGU includes a segment register file for storing address segments, and a circuit for rearranging noncontiguous base and limit bit positions of a first address segment in order to generate a second address segment having all base and limit bits in a contiguous order. The AGU further includes a circuit for executing a single microinstruction to perform read and write operations on a selected field of the second address segments stored in the segment register file.

25 Claims, 4 Drawing Sheets

ADDRESS GENERATION UNIT WITH SEGMENTED ADDRESSES IN A MICROPROCESSOR

This is a continuation of application Ser. No. 08/176,066, filed Jan. 4, 1994, now U.S. Pat. No. 5,590,297, issued Dec. 31, 1996.

FIELD OF THE INVENTION

The present invention pertains to the field of microprocessors. More specifically, the present invention relates to an address generation unit in a microprocessor.

BACKGROUND OF THE INVENTION

A computer system can generally be divided into three basic blocks: a central processing unit (CPU), memory, and an input/output interface (I/O). These blocks are interconnected by one or more buses. Typically, an input device, such as a keyboard, mouse, disk drive, etc., is used to input data and/or computer programs to the computer system through the computer's I/O device. The computer programs instruct the computer system as to how the data should be processed. These instructions and data are usually stored in memory. The CPU retrieves the data stored in the memory and processes the data according to the instructions. The results can be stored back into memory or outputted via the I/O interface to a printer, video monitor, speaker, etc. For example, a user can enter characters by typing on a keyboard. With the help of a wordprocessing software program, the document can be formatted, spell-checked, cut-and-pasted, and otherwise manipulated. The document is usually displayed on a computer screen while it is being drafted. The finished draft can be printed out and saved electronically onto a disk drive for subsequent retrieval.

When a computer program changes a value stored in memory, it is performing a "store" operation. And when the computer is retrieving an instruction or data from memory, it is performing a "load" operation. Each of these load and store operations require an address that specifies a location in memory. In a store operation, the address specifies a location in memory that is available for storing the data. In a load operation, the address specifies the location in memory where the desired instruction or data resides.

Typically, in a modern computer system, there are several different varieties of addressing reflecting different levels of abstraction. For example, in the Intel x86 architecture, there are the logical, linear, and physical addresses.

The logical address is specified in the assembly language or machine code program, and consists of a selector and an offset. The offset is formed by adding together 3 components: base, scaled index and displacement. The logical address space is, therefore, segmented.

The logical address (consisted of segment, offset) is transformed to a flat linear address by adding a segment base corresponding to the segment selector to obtain a linear address.

Both the logical and linear address spaces may be larger than the amount of physical memory in a system. A technique called virtual memory is used to translate the linear address into a physical address used to address a limited amount of physical memory. The limited amount of physical memory is extended by secondary storage, such as a hard disk drive.

As mentioned above, a logical address consists of a segment: offset pair, and the offset is often itself calculated via a formula such as base-register
+index-register*scale
+immediate.

Correspondingly, this implies that the linear address is segment-base+base-register
+index-register*scale
+immediate.

These formulae and the encodings used to represent them in the instruction stream are called "addressing modes."

Addressing modes are motivated by several reasons. First sometimes addressing modes permit programs to be smaller (e.g., by reducing address size). Instead of placing a 32-bit multiple bit logical offset constant in an instruction, they sometimes permit a smaller 1 byte specification of a register, for example. (Note that this is not always true) Second, addressing modes permit programs and subroutines to be written when the addresses of data are not known in advance. The address can be calculated from input and placed in a register. Third, addressing modes permit some frequent calculations to be encoded within the memory reference instruction, rather than requiring separate instructions.

The base registers are generally used by compilers to point to the start of the local variables or arrays. In addition, index registers are used to access the elements of an array or a string of characters. Furthermore, the index register's value can be multiplied by a scale factor (e.g., 1, 2, 4, 8, etc.) which is useful in accessing arrays or similar structures. Lastly, a displacement is added for calculating the final effective address.

Memory can be divided into one or more variable length segments, which can be swapped to disk or shared between programs. Memory can also be organized into one or more "pages". Segmentation and paging are complementary. Segmentation is useful to application programmers for organizing memory in logical modules, whereas pages are useful to the system programmer for managing the physical memory of a system. Typically, a segmentation unit is used to translate the logical address space into a 32-bit linear address space. A paging unit is then used to translate this linear address space into a physical address space. It is this physical address that appears on a microprocessor chip's address pins.

In many CPU's, an Address Generation Unit (AGU) is used to perform the address calculations. The AGU is also responsible for handling all segment opertions and for controlling accesses to all control/test registers. In the past, AGUs were accustomed to handling segments having relatively small widths (e.g., 16 bits). Eventually, advances in microprocessor technology have led to wider and wider segments. At first, in the Intel™ 8086 architecture, a segment selector was used to build the descriptor. Then, in the Intel™ 286 architecture, a 16-bit protected mode used the selector to access memory for the 48-bit descriptor. Eventually, the Intel™ 386 architecture which had a 32-bit protected mode, used the selector to access memory for the 64-bit descriptor. In order to maintain backwards compatibility with previous software, these additional bits were written into separate positions by the operating system. However, these non-contiguous segments are rather difficult to process by the hardware.

Another problem associated with prior art AGU designs is that as segment widths increased, the width of the buses correspondingly needed to increase. However, increasing the bus width is expensive, as it consumes a great deal of silicon area (i.e., die size). Increasing the die size means that less dies can be made from a given wafer. This directly translates into higher production costs.

Yet another problem with prior art AGU designs is that they are slow. One of the factors slowing down the address generation process is attributable to the use of two different descriptor tables. A selector value gives the offset into one of these descriptor tables. Hence, a typical AGU first reads the selector, determines which of the two tables to access, and then actually reads the descriptor value from that table. This process is rather slow and cumbersome.

Furthermore, the next generation of microprocessors are incorporating out-of-order processing. In other words, instructions are not necessarily being executed in the same sequence implied by the source program. In addition, the source code is also being processed speculatively. Speculation is the technique of guessing which way the program will proceed, and performing the execution down that path. This implies that there exists a method of correcting erroneous speculations.

Therefore, there is a need in prior art AGU's for a design that accommodates out-of-order and speculative processing. It would be preferrable if such an AGU were also backwards compatible. It would also be preferrable for such an AGU to have a limited bus width without sacrificing efficiency and also be fast, and flexible.

SUMMARY OF THE INVENTION

The present invention pertains to an address generation unit (AGU) of a microprocessor in a computer system. One of the functions of the AGU is to generate an address corresponding to an entry stored in memory. In order to provide backwards compatibilty with computer programs written for predecessor microprocessor architectures, portions of the segment descriptor, which contains the base, limit, and segment rights values used in calculating and checking the address, are stored in separate sections. Because this format is awkward to process, the separate portions constituting the base and limits are rearranged so as to form a segment having contiguous base, limit, and rights values. The contiguous base, limit, rights, and selector bits are then stored in a register file. Copies of the base and limit are stored in control registers and broadcast to other units. Furthermore, a resettable null bit is stored in another register, indicating whether segment selector is null. In addition, the AGU includes a means for selecting a particular field of the register file and performing read/write operations on the selected field.

The AGU also has the capability of dispatching a segment loads from two different descriptor tables (e.g., local and global descriptor tables). The AGU then determines which of these two segment loads should not have been dispatched and cancels that load. Furthermore, the AGU can load descriptor data into a temporary register. This descriptor data is then checked by the AGU before it is loaded into an architecturally defined register.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An address generation unit is described. In the following description, for purposes of explanation, numerous specific details are set forth, such as registers, modes, violations, faults, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention.

Figure 1:
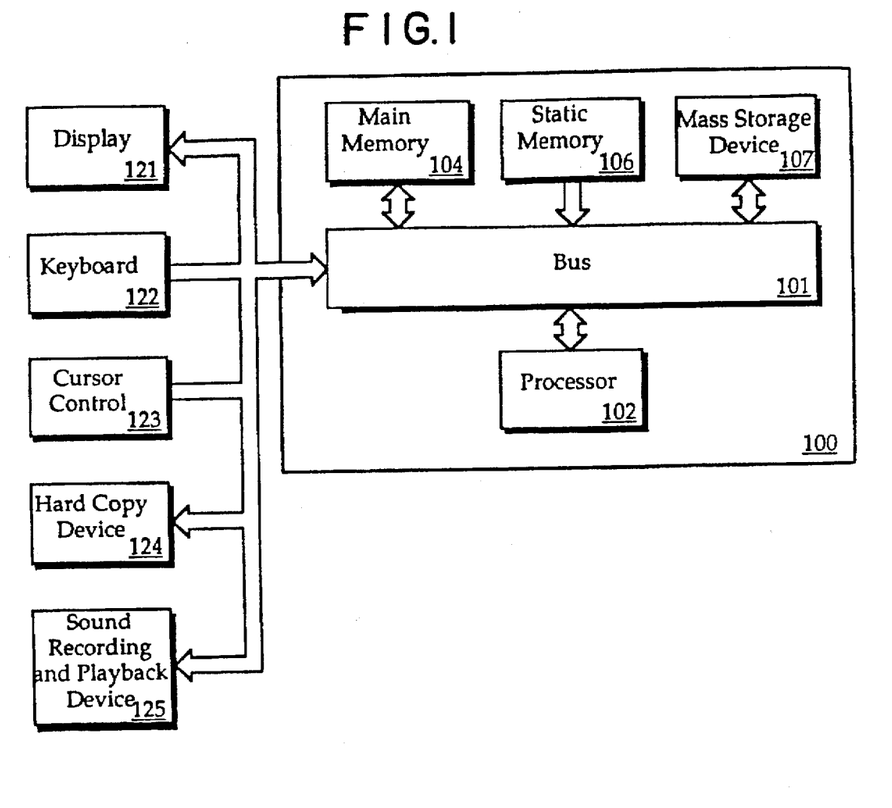
FIG. 1 shows the computer system upon which one embodiment of the present invention is implemented.

Referring to FIG. 1, the computer system upon which one embodiment of the present invention is implemented is shown as 100. Computer system 100 comprises a bus or other communication means 101 for communicating information, and a processing means 102 coupled with bus 101 for processing information. Processor 102 includes, but is not limited to microprocessors; etc. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions.

Computer system 100 may further be coupled to a display device 121, such as a cathode ray tube (CRT) or liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. Furthermore, a sound recording and playback device, such as a speaker and microphone may optionally be coupled to bus 101 for interfacing with computer system 100. Note that any or all of the components of system 100 and associated hardware may be used in a preferred embodiment, however, it can be appreciated that any type of configuration of the system may be used for various purposes as the user requires.

Figure 2:
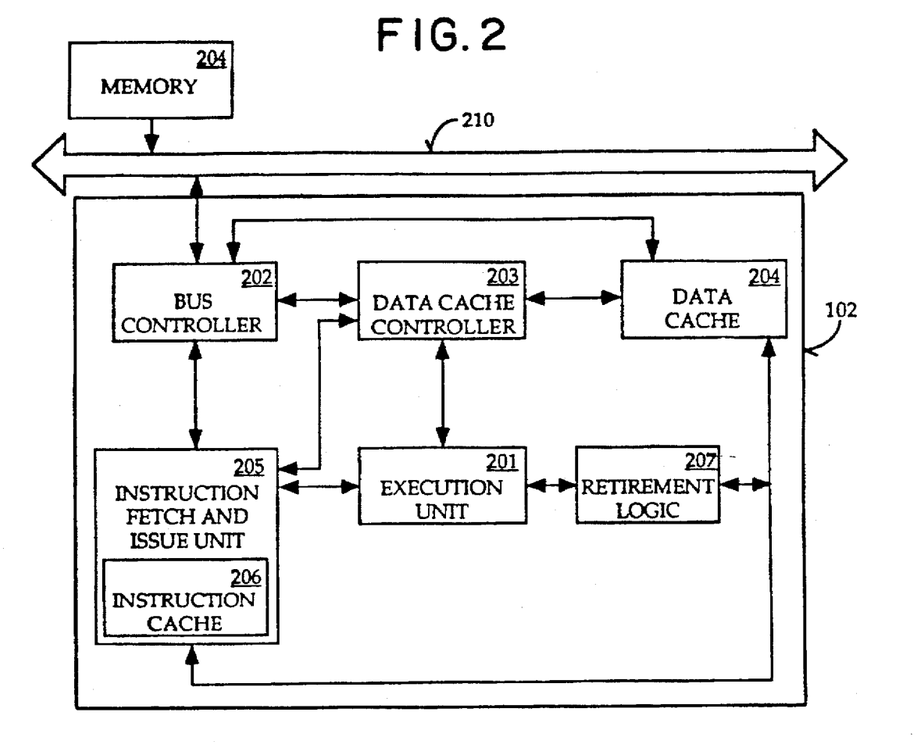
FIG. 2 shows a block diagram illustrating an exemplary processor incorporating the teachings of the present invention.

Referring now to FIG. 2, a block diagram illustrating an exemplary processor 102 incorporating the teachings of the present invention is shown. The exemplary processor 102 comprises an execution unit 201, a bus controller 202, a data cache controller 203, a data cache 204, retirement logic 207, and an instruction fetch and issue unit 205 with an integrated instruction cache 206. The elements 201–206 are coupled to each other as illustrated. Together they cooperate to fetch, issue, execute, and save execution results of instructions in a pipelined manner.

The instruction fetch and issue unit 205 fetches instructions from an external memory through the bus controller 202 via an external system bus. Bus controller 202 manages transfers of data between external components and processor 102. In addition, it also manages cache coherency transfers. The instruction fetch and issue unit 205 then issues these instructions to the execution unit 201 in an in-order sequence. Basically, the execution unit 201 performs such functions as add, subtract, logical AND, and integer multiply. Some of these instructions may be fetched and issued speculatively. The execution unit 201 holds and executes the integer and floating point instructions when their operand dependencies on execution results of preceding instructions are resolved. This includes those integer and floating point instructions that are speculatively fetched and issued. In similar fashion, the execution unit 201 holds and forwards the results of executing an instruction to the retirement logic 207. Retirement logic 207 commits the states of these instructions to whatever permanent architectural state that was designated by the original source code. Data cache controller 203 controls the access of data to/from the data cache 204. Data cache 204 is a fast, small, hardware-maintained scratchpad memory which can be reached in fewer clock cycles than main memory by loads and stores. The data cache controller 203 and the data cache 204 respond to the load instructions immediately, forwarding data if necessary. In contrast, store instructions are buffered until the retirement logic indicates that their state can be committed. In other words, instructions are not necessarily executed/forwarded in the order they were issued. Moreover, some instructions are speculatively executed/forwarded. In any case, the execution results of the integer, floating point, and load instructions are buffered, and then retired or committed in order. In comparison, the buffered store instructions are retired or committed in order and then executed in the "background," at the convenience of the memory system. Speculative integer, floating point, and load execution results and buffered stores expedited due to mispredicted branches are purged.

The instruction fetch and execution unit 205 is intended to represent a broad category of instruction fetching and issuing elements found in many computer systems. Their constitutions and functions are well known and will not be further described. In the presently preferred embodiment, the instruction fetch and issue unit 205 includes an instruction cache 206. The instruction cache 206 is a fast local memory that holds the instructions to be executed. When a program attempts to access an instruction that is not yet or no longer in the cache, the processor must wait until hardware fetches the desired instructions from another cache or memory downstream. It is the responsibility of the instruction fetch and issue unit 205 to decide which instruction cache entry ought to be accessed next for maximal program performance. In the currently preferred embodiment, the instruction cache 206 and data cache 204 exists in a memory hierarchy. The hierarchy is comprised of a small but extremely fast L1 cache. If a memory access to the L1 cache results in a miss, the access is passed on to a bigger, but slower, L2 cache. And if that also results in a miss, the memory access goes to the L3 cache or to the main memory if the processor happens to not have an L3 cache. The data cache controller 203 is used for page miss handling. Furthermore, there is no requirement for the instructions to be fetched from aligned memory locations. In other words, an instruction may be fetched from memory locations spanning two cache lines. However, it will be appreciated that the present invention may be practiced with or without an instruction cache, or with a combined instruction/data cache. If an instruction cache is implemented, page misses may be handled by a dedicated page miss handler, and instructions may be fetched from aligned memory locations.

In the currently preferred embodiment, the AGU is responsible for performing address calculations, handling all segment operations and controlling accesses to all control/test registers. The AGU contains one or more address calculation blocks for calculating linear and effective addresses, as well as checking for segment limit violations, alignment faults, and performing access time protection checks. The AGU also contains a segment block which holds the segment register file, handles all the segment register loads, and contains the hardware which performs protection checks for segment register loads.

If the limit violation and access time protection checks for a memory operation is successful, the AGU sends an address to the memory subsystem where the access is performed, and its function is complete. If the AGU detects a fault on the operation, the AGU drives fault status back to the retirement logic 207 and cancels the operation in the memory subsystem. If a segment load operation (i.e., loading segment register data) detects a fault, the AGU drives fault status back to the retirement logic 207. If the operation requires further microcode assistance, the AGU drives a vector for assistance on the operation. Otherwise, the operation completes successfully. A more detailed description is recited in U.S. patent application Ser. No. 07/174,714, entitled "Method and Apparatus for Loading a Segment Register in a Microprocessor Capable of Operating In Multiple Modes," filed Dec. 29, 1993, and assigned to the assignee of the present invention.

In generating an address, the AGU receives data in the form of a Base address, Index (which is scaled before adding), and Displacement which are added together with the segment base to create the linear address. A small buffer, known as the reservation station, is used to hold micro-operations that have not yet executed and dispatches them according to data dependencies and resource availability. It is the reservation station that sends control and opcode information to the AGU. Memory addressing is controlled via a set of segment registers. These segment registers are explicitly loaded with segment descriptors from memory via microcode sequences. All memory accesses which use a given segment register are implicitly related to the associated segment base address. There is also a limit for each segment of memory. Read/write rights are checked for each memory reference based on the rights in the segment register.

In the currently preferred embodiment, segment descriptors are stored in memory in a format that has been maintained over many generations of microprocessor architecture. This format is used to provide backwards compatibility with software written for the earlier architectures. As a result, this format stored in memory is unwieldy for storing the descriptors in the segment register file of the AGU.

Figure 3A:
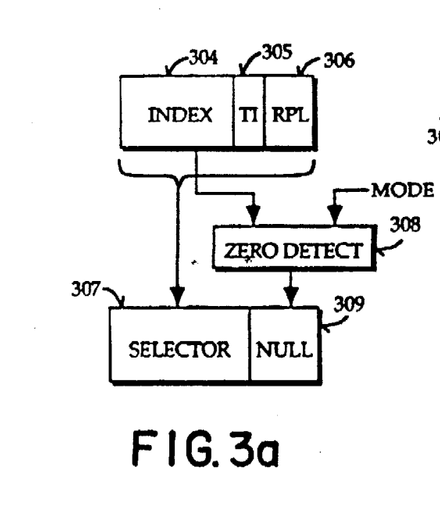
FIG. 3 shows a 64-bit code/data segment descriptors.
Figure 3B:
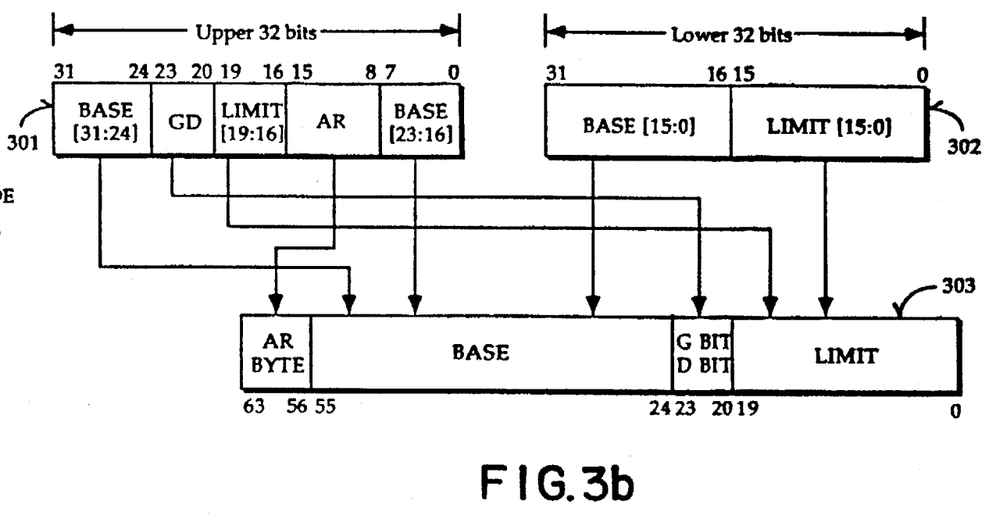

Referring to FIG. 3, a single descriptor composed of a lower 32-bit value 302 and an upper 32-bit value 301 is shown. It can be seen that this descriptor contains intermixed fields. For example, bits 0–7 of value 301 contains bits 23 through 16 [23:16] of the base. Bits 8–15 contain the Access Rights (AR). Bits 16–19 of value 301 contain bits [19–16] of the limit. Bits 20–23 contain the granularity (G) and data size (D) bits. Bits 24–31 of value 301 contains bits [31:24] of the base. Value 302 contains bits [15:0] of the limit and bits [15:0] of the base.

In the present invention, these fields are unscrambled when a segment descriptor is loaded so that they form contiguous fields. Specifically, bits 0–15 of value 302 and bits 16–19 of value 301 are unscrambled to become bits 0–19 of the unscrambled code/data segment descriptor 303. Likewise, bits 0–7 and 24–31 of value 301, along with bits 16–31 of value 302 are unscrambled to form bits 24–55 of segment 303. The G and D bits are placed in bit positions 20–23 of segment 303, and the AR byte is placed in bits 56–63 of segment 303. Note that the limit and base have been consolidated.

A single register in the register file 303 now contains the segment descriptor stored in a contiguous manner. Individual fields of this register can be read and written by microcode, requiring uops for reading and writing it in sections. These code/data segment descriptor registers store information for a memory segment. The segment base is used by the adder to calculate the linear address when accessing a segment. The limit is used to check the effective address for limit violations. The G-bit is used to expand the limit to its proper granularity. The access rights (AR) indicate what type of access rights the segment has, and for stack segments, the direction of expansion of the segment limit.

In the currently preferred embodiment, an index value 304 is used to index into the segment descriptor table specified by the TI bit 305. The TI bit 305 indicates whether the local descriptor table or the global descriptor table is to be used. Furthermore, a requester privilege level (RPL) value 306 is used in conjunction with the descriptor privilege level (DPL) in the AR byte and the current privilege level to check the segment for privilege violations when loaded. The index 304, TI bit 305, and RPL 306 are combined to form the selector value 307. Selector 307 is used as an offset into the appropriate segment descriptor table. In addition, a zero detect 308 sets the null bit 309 if both the index 304 and TI bit 305 are zero and the processor is in the protected mode. Otherwise, the null bit 309 is cleared. If the null bit 309 is set, any access using that segment register generates a fault. Note that the selector 307 and the null bit 309 are stored with the descriptor 303 (i.e., they are part of the same register).

There are microinstructions defined to read/write each field in the descriptor. This includes operations to read and/or write the selector, the access rights, descriptor privilege level (DPL), the G and D bits, the limit, and the base. There are also read/write microinstructions defined to transfer entire segments between entries of the register file. The immediate data input for these read/write operations indicates which field in the segment register file to read or write.

On a memory access the segment base is read out of the register file and an ADD function is performed on it to obtain the linear address. This read takes a clock cycle. Invalid operations are detected, and the register file is not read for those invalid operations. This feature is implemented by using the default segment register address (i.e., there is no segment register entry associated with it). Every clock cycle that the reservation station is not sending a real access, it sends all "0's" on the address lines which does not correspond to a segment register file (SRF) entry.

In the currently preferred embodiment, the register file containing the segments and selectors is 96 bits wide. However, the data path of the AGU is only 32 bits wide. This means that only 32-bit read/write operations can be performed on the register file. Consequently, field read/write operations are defined so that certain bits of the register file can be selectively written to or read from. One of the inputs the AGU receives with these operations is an indicator specifying which field to read or write. These segment register file field operations include: a read selector field, a write selector field, a read rights field, a write rights field, a read segment limit field, a write segment limit field, a read segment base field, and a write segment base field.

The read selector field operation reads out the data in the selector field bits of the segment register in the register file. These bits are driven out from the AGU on the writeback bus, and a writeback data valid bit is set. The 16 bits are right justified on bits [15:0] of the writeback bus, and the upper 16 bits are forced to zero. The write selector field operation writes data into the selector field segment register in the register file. The data comes into the AGU on the lower 16 bits of a source 2 input.

The segment register to be written to is indicated on the SRF address input. Source 2 is a data input to the AGU from the reservation station. SRF address input is a 4-bit field which normally indicates the segment register to be used for a memory access.

The read rights field operation reads the data in the access rights field of the descriptor along with the data in the G/D bit field. The data ordering is changed so that the bits end up in the correct order as specified by the architecture. The write rights field operation writes the AR byte and the G-D bit fields of the segment descriptor specified by the destination segment register address on the SRF address input. The AR byte arrives on bits [15:8] and the G-D bit fields on bits [23:20] of source 2. The other bits of the descriptor are left unchanged.

Figure 4:
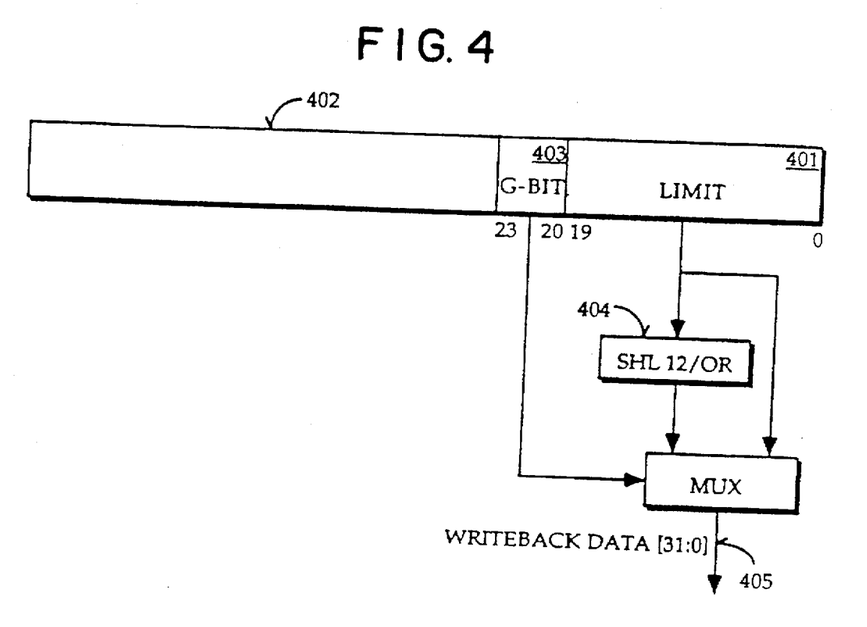
FIG. 4 shows a read segment limit operation.

FIG. 4 shows a read segment limit operation. The read segment limit field operation reads the 20-bit limit value 401 from segment register 402 and converts it to a 32-bit value based on the granularity bit 403. For one-byte granularity, the 20 bit limit is converted by zero extending the upper 12 bits. For 4-kilobyte granularity, shifter 404 shifts the 20 bit limit left by 12 into the upper 20 bits of the writeback, and the lower 12 bits are filled in with ones. The fill of ones is necessary to ensure that each byte of the last valid page of the segment are considered valid. If the limit were filled in with zeros, then a limit violation would occur when trying to access the bytes on the last page of the segment. The converted limit is driven onto the 32-bit writeback bus 405. The write limit field operation takes input from source 2 and writes it to the lower 20 bits of the segment register file. The rest of the register is left unchanged.

The microcode changes the G-bit via the write AR-byte field operation in order to alter the granularity of the limit.

The read segment base field microoperation reads the 32-bit segment base out of the segment register and drives it on the writeback bus. The write segment base field microoperation writes the 32-bit source 2 value into the segment base field of the segment register file.

In the currently preferred embodiment, the following microcode is used to implement this process:

| t1 | ← | ld_descriptor_cond (* GDTR: (memory address) ) write_selector (selector_temp) |
|---|---|---|
| t2 | ← | ld_descriptor_cond ( * LDTR: memory address) write selector (selector_temp) |
| descriptor | ← | select . GLOBAL (t1, t2) | where

Write_selector (selector_temp) is a microinstruction modifier that indicates that a temporary selector register should be modified.

Ld_descriptor_cond() is a microinstruction loading a 64 bit descriptor from memory. The load is performed, however, only if the lower bits of the address correspond to the segment selector GDTR or LDTR associated with the microinstruction; otherwise the load is cancelled and a special flag is written to the output t1 or t2.

Select.GLOBAL() is a conditional select operation that selects which ever of its inputs t1 and t2 indicated that the corresponding ld_descriptor_cond succesfully completed.

Thus, an address generation unit with segmented addresses in a microprocessor is disclosed.

What is claimed is:

1. A processor comprising:

a bus;

a memory;

an execution unit coupled to said bus for performing arithmetic functions;

a fetch unit coupled to said bus for determining an entry is to be accessed;

an issue unit coupled to said bus for accessing said entry from storage in said memory; and an address generation unit (AGU) coupled to said bus for generating an address corresponding to said entry, said AGU including a segment register file for storing address segments, a circuit for rearranging noncontiguous base and limit bit positions of a first address segment in order to generate a second address segment having all base and limit bits in a contiguous order, and a circuit for executing a single microinstruction to perform read and write operations on a selected field of said second address segments stored in said segment register file.

2. The processor of claim 1, wherein said circuit rearranges said first address segment when said first address segment is loaded from said memory into said segment register file.

3. The processor of claim 1, wherein said AGU performs read and write operations of an entire address segment entry stored in said segment register file.

4. The processor of claim 1, wherein said selected field is a selector field.

5. The processor of claim 1, wherein said selected field is a base field.

6. The processor of claim 1, wherein said selected field is a limit field.

7. The processor of claim 6, wherein a read of said limit field causes said value to be scaled based on a granularity bit stored in said segment register file.

8. The processor of claim 1, wherein said selected field is a descriptor privilege level field.

9. The processor of claim 1, wherein said selected field is an access rights field which includes an access rights byte, a granularity bit, and a data size bit of an address segment stored in said segment register file.

10. An apparatus comprising:

a bus means for transmitting digital signals;

a memory means coupled to said bus means for storing information;

an execution means coupled to said bus means for performing arithmetic functions;

a fetch means coupled to said bus means for determining an entry to be accessed;

an issue means coupled to said bus means for accessing said entry from storage in said memory means; and an address generation means coupled to said bus means for generating an address corresponding to said entry, said address generation means comprising a segment register means for storing address segments and an arrangement means for rearranging noncontiguous base and limit bits of a first address segment, thereby producing a second address segment having all base and limit bits in a contiguous order, said address generation means further including a means for executing a single microinstruction to perform read and write operations on a selected field of said second address segment stored in said segment register means.

11. The apparatus of claim 10, wherein said arrangement means rearranges said first address segment upon loading said first address segment into said segment register means from said memory.

12. The apparatus of claim 10, wherein said address generation means performs read and write operations of an entire address segment entry stored in said segment register means.

13. The apparatus of claim 10, wherein said selected field is a selector field.

14. The apparatus of claim 10, wherein said selected field is a base field.

15. The apparatus of claim 10, wherein said selected field is a limit field, a read of said limit field causing a value resident in said field to be scaled based on a granularity bit stored in said segment register means.

16. The apparatus of claim 10, wherein said selected field is a descriptor privilege level.

17. The apparatus of claim 10, wherein said field is an access rights field which includes an access rights byte, a granularity bit, and a data size bit of an address segment stored in said segment register means.

18. A computer system comprising:

a bus;

a main memory coupled to said bus, said main memory storing data;

a microprocessor coupled to said bus for processing said data, said microprocessor comprising:

a memory;

an execution unit coupled to said bus for performing arithmetic functions;

a fetch unit coupled to said bus for determining an entry to be accessed;

an issue unit coupled to said bus for accessing said entry from storage in said memory;

an address generation unit (AGU) coupled to said bus for generating an address corresponding to said entry, said AGU includes a segment register file for storing address segments, a circuit for rearranging noncontiguous base and limit bit positions of a first address segment in order to generate a second address segment having all base and limit bits in a contiguous order, and a circuit for executing a single microinstruction to perform read and write operations of a selected field of said second address segment stored in said segment register file.

19. The computer system of claim 18, wherein said circuit rearranges said first address segment when said first address segment is loaded into said segment register file from said memory.

20. The computer system of claim 18, wherein said AGU performs read and write operations of an entire address segment entry stored in said segment register file.

21. The computer system of claim 18, wherein said selected field is a selector field.

22. The computer system of claim 18, wherein said selected field is a base field.

23. The computer system of claim 18, wherein said selected field is a limit field, a read of said limit field causing a value resident in said limit field to be scaled based on a granularity bit stored in said segment register file.

24. The computer system of claim 18, wherein said selected field is a descriptor privilege level field.

25. The computer system of claim 18, wherein said selected field is an access rights field which includes an access rights byte, a granularity bit, and a data size bit of an address segment stored in said segment register file.

* * * * *